United States Patent Office 3,356,727
Patented Dec. 5, 1967

3,356,727
ALKYL- AND ALKARYL-OXYALKYL-N-HYDROXYALKYL AMINE OXIDES
Adolf Koebner and Herbert Alexander Potts, Cumberland, England, assignors to Marchon Products Limited, London, England, a corporation of the United Kingdom
No Drawing. Filed June 23, 1964, Ser. No. 377,399
Claims priority, application Great Britain, June 25, 1963, 25,137/63; July 22, 1963, 28,837/63; June 4, 1964, 23,304/64
15 Claims. (Cl. 260—570.7)

This invention is concerned with improvements in or relating to certain surface-active agents, their production and use. The invention is also a modification of that of our pending application No. 255,224, hereinafter termed the parent application filed January 31, 1963, and issued as Patent No. 3,206,512 on Sept. 14, 1965.

The parent application describes and claims, inter alia a process for the production of amine oxides of the formula $Z(OCH_2CH_2)_nN(O)R'R''$, wherein Z is an alkyl group having from 8 to 18 carbon atoms, n has a value from 2 to 10, R' is an alkyl group having from 1 to 4 carbon atoms and R'' is either an R' or $Z(OCH_2CH_2)_n$— group or R' and R'' together form a five- or six-membered heterocyclic ring, which comprises reacting an organic sulphate of the formula $Z(OCH_2CH_2)_nOSO_3M$, wherein M is a cation, with a secondary amine of the formula R'R''NH, the reaction being carried out in the presence of a solvolytic medium and a base at a temperature of at least 100° C.; and thereafter reacting the resulting amine of the formula $Z(OCH_2CH_2)_nNR'R''$ with a peroxidising agent. The parent application also describes and claims the tertiary amines produced as intermediates in this process and the resulting amine oxides as novel compounds. It also claims detergent compositions comprising from 1 to 25% by weight of an amine oxide as claimed per se and at least one other surface-active agent which is anionic or non-ionic.

We have now discovered that valuable surface-active agents are obtained if the amine reactant R'R''NH in the above-mentioned process of the parent application is a particular alkylolamine, namely one containing a hydroxyethyl or hydroxypropyl group or a condensed hydroxyethyl or hydroxypropyl group. There then results amine oxides containing hydroxyethyl and/or hydroxypropyl substituents linked to the nitrogen atom and we have found that these impart to the amine oxides improved properties as surface-active agents. Similar surface-active agents may also be prepared by the use of an organic sulphate ester wherein the group Z in the formula given represents an alkylphenyl group possessing an alkyl substituent having from 6 to 16 carbon atoms.

We have also found that the process of the parent application can be modified by using organic sulphate esters which contain at least one oxypropylene group so that the hydrophobic hydrocarbon group (Z in the formula) is linked to the nitrogen atom of the amine oxide by an oxyalkylene chain which contains one, preferably 2 to 4, oxypropylene groups, if desired together with one or more oxyethylene groups arranged randomly or sequentially with the oxypropylene group. These oxypropylene groups are of a more hydrophobic nature than the oxyethylene group and their presence therefore leads to amine oxides having a different degree of surface-activity to those containing only oxyethylene linkages and this is advantageous for some purposes.

The above-described amine oxides are novel compounds and constitute a feature of the present invention. Moreover, we find that certain of the intermediate amines, are also novel compounds and constitute a further feature of the invention. The amine oxides find particular use as modifying agents for incorporation in detergent formulations with anionic and/or non-ionic surface-active agents. The amine oxides, we find, are substantially non-irritant to the skin and since they are surface-active in their own right, their incorporation in detergent formulations militates against the harmful effects on the skin often manifested by conventional detergent formulations, while at the same time the formulations exhibit a satisfactory degee of cleaning power.

Accordingly, from one aspect the invention provides a process for the production of amine oxides of the formula

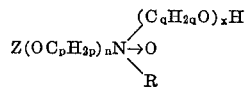

wherein Z is an alkyl or alkenyl group having from 8 to 18 carbon atoms or an alkylphenyl group possessing an alkyl substituent having from 6 to 16 carbon atoms, R is a group of formula $—(C_qH_{2q}O)_xH$, or is a group of formula $Z(OC_pH_{2p})_n—$, or is an alkyl group having from 1 to 4 carbon atoms, p in each oxyalkylene group $—OC_pH_{2p}—$ is 2 or 3, q in each alkyleneoxy group $—C_qH_{2q}O—$ is 2 or 3, n has a value from 2 to 10, and each x has a value of from 1 to 20, which process comprises: (1) reacting an organic sulphate ester of the formula $Z(OC_pH_{2p})_nOSO_3M$, wherein M is a cation, with an alkylolamine of the formula

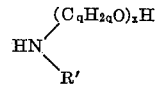

wherein R' maybe the same as R above or may be a hydrogen atom, in the presence of a solvolytic medium and a base at a temperature of at least 100° C.; (2) optionally, reacting the resulting tertiary amine

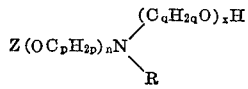

with ethylene and/or propylene oxide to increase the value of x to a value of not more than 20; and (3) thereafter, reacting the tertiary amine resulting from stages 1 or 2 with a peroxidising agent.

From a second aspect, the invention provides novel amine oxides of the formula

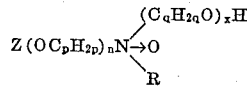

wherein Z, R, p, q, n and x are each as hereinbefore defined.

From a third aspect, the invention provides novel tertiary amines of the formula

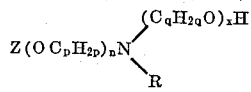

wherein Z, R, p, n and x are each as hereinbefore defined, with the exception that when Z represents an alkylphenyl group, at least one alkyleneoxy group $—C_qH_{2q}O—$ is a propyleneoxy group with q having a value of 3.

From a fourth aspect, the invention provides detergent compositions which comprise from 1 to 25% by weight of an amine oxide according to the second aspect of the invention and at least one other surface-active agent which is anionic or non-ionic, preferably a surface-active alkyl-benzene-sulphonate, alkyl sulphate, alkyl (poly)oxyalkylene sulphate and/or alkylphenyl (poly)-oxyalkylene sulphate.

Some of the monosulphate esters which may be used in the first stage of the process of the invention are already commercially available chemicals for use as surface-active agents, though as such agents they possess disadvantages, particularly as to their irritant effect on skin, which are not possessed by the amine oxides of the invention. In any case the amine oxides are not anionic compounds and, therefore, are surface-active agents of a different kind. The monosulphate esters are prepared by sulphation of the appropriate alkyl (poly)oxyalkylene alcohol or alkylphenyl (poly)oxyalkylene alcohol of the formula $Z(OC_pH_{2p})_nOH$. Such sulphation may be carried out with sulphuric acid, sulphur trioxide or chlorsulphonic acid. The resulting sulphuric acid mono-ester is neutralised with a base to provide the cation M in the monosulphate ester of the formula $Z(OC_pH_{2p})_nOSO_3H$. In these formulae Z represents an alkyl or alkenyl group having from 8 to 18 carbon atoms or an alkylphenyl group possessing an alkyl substituent having from 6 to 16 carbon atoms; M is a cation; $n$ has a value of from 1 to 10, preferably from 2 to 4, and each oxyalkylene group —$OC_pH_{2p}$— is an oxyethylene or oxypropylene group. If the polyoxyalkylene chain contains both oxyethylene and oxypropylene groups, these may be linked together randomly or sequentially and are preferably present in a ratio such that the weights of the two kinds of groups are substantially equal. Z preferably represents a lauryl, tridecyl, myristyl, cetyl, oleyl, stearyl, 2-methyl-pentadecyl, p-octylphenyl, p-nonylphenyl or p-dodecylphenyl group. The cation M is such that the monosulphate ester is soluble in the solvolytic medium employed and the ester is preferably an alkali-metal or alkylolamine, particularly or dialkylolamine, salt.

The alkyl (poly)oxyalkylene alcohols and alkylphenyl (poly)oxyalkylene alcohols used to prepare the monosulphates are usually condensates of ethylene and/or propylene oxide with alcohols or alkylphenols as the case may be. Reactions to produce such condensates do not usually give a uniform product, but a spectrum of compounds in which the number of oxyalkylene units contained in the product varies on either side of a number corresponding to the number of molecular proportions of alkylene oxide employed. Thus it is to be understood that references herein to a single compound containing a (poly)oxyalkylene chain —$(OC_pH_{2p})$— are to be construed as including a reference to mixtures of such compounds with different values of $n$, the value of $n$ given in the formula denoting an average value which corresponds to the number of molecular proportions of alkylene oxide used in preparing the condensates. Similarly, the preparation of compounds described herein which possess an alkyleneoxy chain —$(C_qH_{2q}O)_x$— chain, where $x$ has a value greater than 1, involves the condensation of ethylene and/or propylene oxide, and likewise references herein to a single compound containing an alkyleneoxy chain —$(C_qH_{2q}O)_x$— where $x$ has a value greater than 1, are to be construed analogously to the value of $n$ in regard to the polyoxyalkylene groups —$(OC_pH_{2p})_n$—.

The alkylolamine for use in the first stage of the process of the invention is preferably a dialkylolamine, such as diethanolamine, di-isopropanolamine or di-(3-hydroxypropyl)-amine. However, a monoalkylolamine may also be reacted with two molar proportions of the monosulphate ester to produce a tertiary amine of the formula $$[Z(OC_pH_{2p})_n]_2N(C_qH_{2q}O)_xH$$

or an N-alkyl-alkylolamine, such as N-methylethanolamine, may be reacted with one molar proportion of the monosulphate ester to produce a tertiary amine of the formula

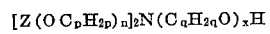
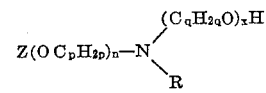

wherein R is an alkyl group having from 1 to 4 carbon atoms. Though not readily obtainable the alkylolamine reactant may be a dialkylolamine or monoalkylolamine of the formula

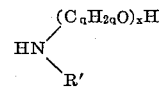

wherein $q$ in each alkyleneoxy group —$C_qH_{2q}O$— is 2 or 3 and each $x$ has a value greater than 1, but not greater than 20.

The preparation of the tertiary amines as the first stage of the process of the invention requires that the monosulphate ester and alkylolamine be heated together at a temperature of at least 100° C. in the presence of a solvolytic medium and a base. By solvolytic medium we mean a highly polar liquid which is a solvent for the organic sulphate. The preferred medium is an excess of the alkylolamine, but there may be employed an aqueous medium containing a dissolved base, that is an aqueous medium having a pH value greater than 7. Other highly polar liquids that may be employed as solvolytic media include, for example, dimethyl sulphoxide, sulpholane and primary alcohols having from 10 to 20 carbon atoms. The base may be a tertiary amine or an alkali-metal hydroxide or carbonate. However, more preferably it is the alkylolamine reactant itself present in excess, a 5 molar excess often giving optimum results. Thus, it is preferred to use an excess of the alkylolamine to function as reactant, solvolytic medium and base. It is also often convenient if the cation M in the monosulphate is an alkylolammonium ion derived from the reactant alkylolamine; in such instances, the salt of the organic sulphuric acid and the alkylolamine is preferably preformed and then heated above 100° C. in the presence of an excess of the alkylolamine or an additional base.

Preferably, the reaction temperature is in the range 150–250° C. The use of reaction temperature above 100° C. in an aqueous medium requires the use of pressure vessels, for example, autoclaves. The time of reaction required for complete alkylation of the alkylolamine by the monosulphate ester may vary from about 30 minutes to 12 hours, but often it is a period of from 1 to 6 hours.

The tertiary amines produced as described above may be purified in conventional manner, for instance by extraction of the reaction mixture with a liquid which removes either the formed tertiary amine or the excess reactants and the by-products of the reaction, such as the sulphate salt of the base employed. For instance, the excess alkylolamine may sometimes be removed from the formed tertiary amine by washing with water since the alkylolamine, usually unlike the tertiary amine, is appreciably soluble in water. Alternatively, when (as is preferred) the cation M is derived from the alkylolamine reactant, and the solvent and the base are constituted by an excess of the alkylolamine, the reaction products may be allowed to settle into two layers: the upper layer being the desired tertiary amine which requires washing with water, the lower layer being a mixture of the alkylolamine sulphate and excess alkylolamine from which the alkylolamine may be liberated and recovered by conventional methods. To assist the separation of these two layers it is preferred to add to the reaction mixture about 40% by weight of water so that the lower layer is then constituted by an aqueous solution of the alkylolamine sulphate and excess alkylolamine.

The second stage of the process is an optional one and involves increasing the length of the hydroxy-terminated alkyleneoxy chain or chains —$(C_qH_{2q}O)_xH$ in the tertiary amine product from stage 1 should this be desired. For instance, it may be desirable that the value of each $x$ in the eventual tertiary amine oxide of general formula

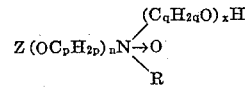

should have a value greater than 1. It is then most convenient to make such a compound by using an alkylolamine of formula

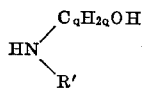

in the first stage of the process to provide a tertiary amine of the formula

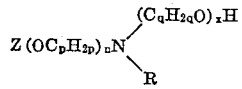

where each $x$ has a value of 1 and then to increase this value of $x$, up to a value of 20 if desired, by reacting the amine with ethylene and/or propylene oxide as the case may be.

The said optional second stage is carried out by reacting the tertiary amine product from statge 1 with the required molar amount of ethylene oxide, propylene oxide, or a mixture thereof employed concurrently or sequentially, preferably under super-atmospheric pressure, for example up to 5 atmospheres, usually in the presence of an alkylene oxide condensation catalyst. Such catalyst may be a Lewis acid, such as boron trifluoride, sulphuric acid, aluminium chloride or zinc chloride or a base such as an alkali-metal hydroxide, hydride or alkoxide. The reaction is usually conducted at a temperature of 50–200° C. for a period until no further reaction occurs. The product is then washed free of catalyst and purified in any convenient manner, for example, by steam stripping.

The novel amines of the invention are the intermediates obtained during the preparation of the amine oxides of the invention, with the exception that, when an alkylphenyl polyoxyalkylene sulphate is employed as reactant, the novel amines are those that contain at least one hydroxypropyl or condensed hydroxypropyl substituent on the amino nitrogen atom. As examples of novel amines of the invention there may be mentioned:

lauryl-trioxyethylene bis-(2-hydroxyethyl) amine;
lauryl-trioxyethylene bis-(2-hydroxypropyl) amine;
lauryl-dioxyethylene bis-(3-hydroxypropyl) amine;
lauryl-trioxyethylene monoethyl 2-hydroxyethyl amine;
p-nonylphenyl-dioxyethylene bis-(2-hydroxypropyl) amine;
p-octylphenyl-trioxyethylene bis-(2-hydroxypropyl) amine;
lauryl-trioxypropyl bis-(2-hydroxyethyl) amine;
cetyl-dioxyethylene bis-(2-hydroxyethyl) amine;
cetyl-tetraoxyethylene bis-(2″-hydroxyethyldioxyethylene) amine;
oleyl-trioxyethylene bis-(2-hydroxypropyl) amine; and
lauryl-dioxyethylene bis-(2″-hydroxypropyldioxypropylene) amine, where the "lauryl" groups are often derived from the mixture of alcohols predominating in dodecyl alcohol obtained by catalytic hydrogenation of the "narrow-cut" or "middle-cut" fractions of fatty acids or their esters isolated from coconut oil.

The third stage of the process of the invention comprises reacting the tertiary amine product from the first or second stage of the process with a peroxidising agent to produce the corresponding amine oxide. The peroxidising agent is normally used in a substantially equimolar proportion to the amine and it may be, for instatnce, hydrogen peroxide, a percarboxylic acid or ozone. When hydrogen peroxide is employed, it is preferred that at least a 20 volume solution be used; 30% hydrogen peroxide or stronger often provides a more efficient conversion and a 40 volume solution gives very good results. As percarboxylic acids it is preferred to use peracetic, perbenzoic or permonophthalic acid. When ozone is employed it is customary to use it dissolved in an inert solvent such as chloroform. Otherwise the peroxidation reaction is conveniently carried out in an aqueous medium at ambient temperatures. The tertiary amine is normally mixed with the peroxidising agent and left to stand, often while being stirred, until oxidation is complete. This may take from 1 to 24 hours, and a reaction period of at least 6 and often about 12 hours normally provides optimum results. If desired, the reaction mixture can be subjected to mild heating of up to about 50° C. Mixtures of peroxidising agents can be used and those mentioned above can be used in conjunction with such compounds as persulphates, persulphuric acids or perborates.

The amine oxide may be separated from the reaction mixture by extraction with a suitable solvent, but this is not normally necessary if the amine oxide is prepared in an aqueous medium in which it is soluble and is to be used in the form of such a solution. In these instances, the reaction mixture is simply extracted with a water-immiscible liquid, for example light petroleum which removes any unreacted amine, and then used as such. The amine oxides are not readily distilled even at reduced pressure as on heating they tend to decompose.

The preferred amine oxides of the invention are those prepared from the preferred reactants previously described. They include:

lauryl trioxyethylene bis-(2-hydroxyethyl) amine oxide;
p-nonylphenyl tetraoxyethylene bis-(2-hydroxyethyl) amine oxide;
p-octylphenyl dioxyethylene bis-(2-hydroxypropyl) amine oxide;
lauryl dioxyethylene bis-(2-hydroxypropyl) amine oxide;
lauryl-trioxyethylene bis-(2-hydroxypropyl) amine oxide;
lauryl-trioxypropylene bis-(2-hydroxyethyl) amine oxide;
lauryl-dioxyethylene bis-(2″-hydroxypropyl dioxypropylene) amine oxide;
lauryl-trioxyethylene bis-(2″-hydroxyethyldioxyethylene) amine oxide;
cetyl-dioxyethylene bis-(2-hydroxyethyl) amine oxide;
oleyl-trioxyethylene bis-(2-hydroxyethyl) amine oxide; and
lauryl-trioxyethylene monoethyl 2-hydroxypropyl amine oxide.

The amine oxides of the invention find particular use as surface-active agents. They are also mildly bacteriostatic and therefore find a use in germicidal soaps and detergent compositions, such as shampoos. Some of them are also useful softening agents for textiles.

When the present amine oxides are prepared such that the value of $x$ in the general formula therefor is 1, that is by employing an alkylolamine reactant wherein the value of $x$ in the formula therefor is also 1 and omitting the optional second stage of the process, they possess advantages as surface-active agents over amine oxides nominally of the same formula but obtained by a different process. Thus if a primary amine of formula

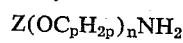

or secondary amine of formula

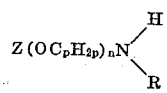

wherein R is a $Z(OC_pH_{2p})_n$— group or an alkyl group having from 1 to 4 carbon atoms, is reacted with one or two moles respectively of ethylene or propylene oxide, the resulting tertiary amine will be contaminated with compounds containing condensed alkyleneoxy groups —$(C_qH_{2q}O)_xH$ where $x$ has a value greater than 1 and therefore also contaminated with primary or secondary amine wherein an amino-hydrogen atom has remained unreacted with the alkylene oxide. This is so since towards the end of the reaction the higher concentration of alcohols relative to the primary and secondary amine concentrations overcompensates the higher reactivity of the alkylene oxide for the latter. When this contaminant primary or secondary amine is reacted (in admixture with the tertiary amine) with a peroxidizing agent an amine oxide is not formed and the resulting amine oxides produced from the tertiary amine are, therefore, contaminated with other products and these militate against the mildness effect on the skin manifested by the desired tertiary amine oxides.

The amine oxides can be used alone as surface-active agents, but it is much preferred to use them in detergent compositions admixed with at least one other surface-active agent which is anionic or non-ionic, the amine oxide constituting from 1 to 25% by weight of the composition. In such compositions the amine oxides fulfill the further function of acting as foam boosters and are more efficient for this purpose than the fatty acid alkylolamides conventionally employed, this is particularly so when the compositions are employed in soft water. Moreover, the amine oxides do not, in general, have an irritant effect on the skin and when used in conjunction with anionic surface-active agents produce a mildness effect so that the irritant effect often produced by such anionic surface-active agents is militated.

Such anionic surface-active agents may be, for instance, salts of alkylarylsulphonic acids wherein the alkyl group contains from 8 to 18 carbon atoms and may be straight- or branched-chain, for example sodium, ammonium or alkylolamine salts of dodecylbenzenesulphonic acid; alkyl sulphates wherein the alkyl group contains from 8 to 18 carbon atoms, for example lauryl sulphate or coconut alcohol sulphate; alkyl polyether sulphates wherein the alkyl group contains from 8 to 18 carbon atoms for example lauryl polyoxyethylene sulphates containing from 1 to 10, preferably from 2 to 4, oxyethylene groups; and alkylphenyl polyether sulphates, such as p-tert-octyl- or p-nonyl-(poly)oxyethylene sulphates containing from 1 to 10, preferably from 2 to 4 oxyethylene groups. The amine oxide may also advantageously be used in admixture with non-ionic surface-active agents such as alkyl(poly)oxyethylene alcohols wherein the alkylphenol has from 6 to 16 carbon atoms in the alkyl group and which contains from 1 to 20 oxyethylene groups, particularly condensates of p-octylphenol or p-nonylphenol with from 11 to 15 molar proportions of ethylene oxide.

The amine oxides are preferably used in admixture with the anionic and/or non-ionic surface-active agents in a weight ratio of anionic and non-ionic surface-active agents to amine oxide of from 20:1 to 1:1, preferably from 10:1 to 2:1. The mildness and foam boosting effects of the amine oxides are manifested to the greatest extent when they are used in conjunction with the alkylbenzenesulphonates and/or the alkyl sulphates and/or the alkyl polyether sulphates.

The amine oxides may be used in liquid or solid detergent formulations of the light or heavy duty type. Such compositions may contain the usual additives in the conventional proportions, for instance, foam boosters such as alkylolamides, particularly coconut acid monoethanolamide or coconut acid mono-isopropanolamide; sodium tripolyphosphate; tetrapotassium pyrophosphate; soda ash; sodium metasilicate; sequestering agents such as aminopolycarboxylate salts, for example salts of ethylenediamine tetra-acetic acid or N-(2-hydroxyethyl)-ethylene triacetic acid; hydrotropes such as sodium toluene- or xylene-sulphonates; water-miscible solvents such as ethanol or isopropanol; perfumes and colouring additives. In such compositions the amine oxide is present in an amount of from 1 to 25%, preferably 1 to 10%, by weight of the composition, which may be, however, further diluted for washing purposes.

The preferred detergent formulations of the invention are liquid compositions of the light duty type which consist of an aqueous solution containing only from 10 to 50% by weight of the composition of a mixture of the amine oxide and alkylbenzenesulphonates and/or alkyl sulphates and/or alkyl polyethylene ether sulphates in the above specified proportions, the balance being inorganic sulphate and water, except for up to 15% by weight of the composition which may comprise such adjuvants as alkylolamides, hydrotropes, water-miscible alcohols, perfumes and colouring agents. Such compositions are useful for dish-washing purposes and, when they comprise alkyl sulphates and/or alkyl polyethylene ether sulphates as the anionic surface-active agents, as shampoos.

Certain of the preferred light duty liquid detergent compositions are particularly suited for use as shampoos since it is found that the amine oxides also reduce the build up of static electricity on dry hair and, therefore, that their presence increases the manageability of the hair after washing. Such shampoo compositions will normally be marketed containing 70–85% of water, but solutions more concentrated or diluted may, of course, be marketed if desired. It is, therefore, appropriate to consider only the other ingredients present and express the proportions of each on a weight basis of the total composition but with the water notionally excluded. On this basis the amine oxide will normally comprise from 5 to 30%, preferably 10–15% of the composition. The remainder will normally consist of one or more of the surface-active alkyl sulphates and/or alkyl polyether sulphates mentioned above, particularly in the form of their alkylolamine or sodium salts, though up to 20% of the composition on the specified basis may comprise a fatty acid alkylolamide as additional foam booster. In these shampoo compositions, no other ingredients, apart from perfumes and colouring agents, and possibly a water-miscible alcohol, are normally present.

The invention will now be illustrated by the following examples in which all quantities (unless otherwise stated) are expressed as parts by weight. Examples 1 to 4 illustrate the production of the tertiary amine oxides of the invention, and Examples 5 to 9 compositions containing the amine oxides admixed with other surface-active agents.

*Example 1.—Lauryl-trioxyethylene bis-(2-hydroxyethyl) amine oxide*

Lauryltrioxyethylene sulphuric acid (266 parts) was rapidly stirred into diethanolamine (530 parts) and the mixture heated to 210–220° C. for 4 hours under an atmosphere of nitrogen. The mixture was cooled to 150° C. and allowed to settle. The lower layer was run off and the upper layer washed with three portions of water (200 parts). After vacuum drying this layer there was obtained lauryl-trioxyethylene bis-(2-hydroxy-ethyl) amine (295 parts of base value 137.2 mg. KOH/g.). Subsequently the amine so obtained (205 parts) was stirred with water (805 parts) and 30% aqueous hydrogen peroxide at 40° C. for 24 hours to obtain a 30% aqueous solution of lauryl trioxyethylene bis-(2-hydroxyethyl) amine oxide.

*Example 2.—p-Nonylphenyl-tetraoxyethylene bis-(2-hydroxyethyl) amine oxide*

The procedure of Example 1 was repeated but using p-nonylphenyl-tetraoxyethylene sulphuric acid (266 parts) as the starting material. The resulting p-nonylphenyl-tetraoxyethylene bis-(2-hydroxyethyl) amine (283 parts) had a base value of 117 mg. KOH/g. Subsequently, the amine so obtained (483 parts) was stirred with water (1000 parts) and 30% aqueous hydrogen peroxide (120 parts) at 40° C. for 24 hours. The resulting solution contained 30% of p-nonylphenyl-tetra-oxyethylene bis-(2-hydroxyethyl) amine oxide.

*Example 3.—Lauryl-trioxyethylene bis-(2-hydroxypropyl) amine oxide*

Lauryl trioxyethylene sulphate (100 parts) was added with rapid stirring to di-isopropanolamine (500 parts) and the mixture heated to 200° C. for 4 hours in an inert atmosphere. After cooling, water (400 parts) was added and the lower layer separated off. The upper layer of amine was shaken with hot 5% aqueous sodium hydroxide (100 parts) and then washed several times with boiling water. The product was dried by heating under vacuum to yield the novel amine lauryl-trioxyethylene bis-(2-hydroxypropyl) amine (105 parts) having a base value of 129 mg. KOH/g. Subsequently the amine so obtained (400 parts) was added to water (800 parts) and 30% by weight aqueous hydrogen peroxide (120 parts) and the mixture stirred at 40° C. for 12 hours. The resulting solution contained 30% of lauryl-trioxyethylene bis-(2-hydroxypropyl) amine oxide.

*Example 4.—Lauryl-trioxypropylene bis-(2-hydroxyethyl) amine oxide*

The acid sulphate of a 3 mole condensate of propylene oxide with lauryl alcohol (100 parts) was dissolved in diethanolamine (500 parts) and the solution heated with stirring at 220° C. for 4 hours. On cooling water (400 parts) was added and the mixture allowed to separate into two layers and the lower layer was removed. The upper layer was washed with hot 5% aqueous sodium hydroxide (100 parts) and then several times with hot water before being dried by heating under vacuum. The resulting lauryl-trioxypropylene bis - (2 - hydroxyethyl) amine had a base value of 138 mg. KOH/g. This amine (101 parts) was diluted while stirring with water (700 parts) and 30% aqueous hydrogen peroxide (120 parts) and then heated at 40° C. for 14 hours with continued stirring. There was thus obtained a 30% solution in water of lauryl-trioxypropylene bis-(2-hydroxyethyl) amine oxide.

*Example 5.—Shampoo composition*

A composition of the following formulation was prepared:

| | Percent by weight |
|---|---|
| Triethanolamine lauryl sulphate | 18.0 |
| Lauryl-trioxyethylene bis-(2-hydroxyethyl) amine oxide | 2.5 |
| Water | Balance |

This composition was a very acceptable shampoo. It was mild to the skin and assisted the manageability of the washed hair.

*Examples 5 to 8*

Three compositions which possessed similar properties to that of Example 4 were formulated as follows:

(6)

| | Percent by weight |
|---|---|
| Sodium lauryl-dioxyethylene sulphate | 18.0 |
| p-Nonylphenyl - tetraoxyethylene bis - (2-hydroxyethyl)amine oxide | 2.5 |
| Coconut acid diethanolamide | 2.0 |
| Water | Balance |

(7)

| | Percent by weight |
|---|---|
| Sodium lauryl-trioxyethylene sulphate | 15 |
| Lauryl-trioxyethylene bis - (2-hydroxypropyl) amine oxide | 5 |
| Water | Balance |

(8)

| | Percent by weight |
|---|---|
| Sodium lauryl-dioxyethylene sulphate | 30 |
| Lauryl-trioxypropylene bis-(2-hydroxyethyl) amine oxide | 4-5 |
| Ethanol | 5 |
| Water | Balance |

*Example 9*

A general purpose detergent composition was formulated as follows:

| | Percent by weight |
|---|---|
| Sodium lauryl-trioxyethylene sulphate | 16 |
| Lauryl-trioxyethylene bis - (2-hydroxyethyl) amine oxide | 5 |
| Tetrapotassium pyrophosphate | 10 |
| Potassium toluene sulphate | 5 |
| Water | Balance |

This composition was mild to the skin and very effective for dish-washing purposes.

What we claim is:

1. Amine oxides of the formula

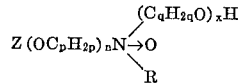

wherein Z is selected from the group consisting of alkyl and alkenyl having 12 to 18 carbon atoms and alkylphenyl wherein the alkyl group contains from 8 to 12 carbon atoms; R is selected from the group consisting of lower alkyl, $Z(OC_pH_{2o})_n$— and —$(C_qH_{2q}O)_xH$; $p$ in each oxyalkylene group —$OC_pH_{2p}$— is an integer of from 2 to 3; $q$ in each alkyleneoxy group —$C_qH_{3q}O$— is an integer of from 2 to 3; $n$ has a value of from 2 to 5; and each $x$ has a value of from 1 to 3.

2. The amine oxides of claim 1 wherein Z is selected from the group consisting of alkyl and alkenyl having 12 to 18 carbon atoms, and alkylphenyl wherein the alkyl group contains 8, 9, or 10 carbon atoms.

3. Amine oxides as claimed in claim 2, wherein $x$ has a value of 1, R is a group of formula —$C_qH_{2q}OH$, and $n$ has a value of from 2 to 4.

4. Amine oxides as claimed in claim 3, wherein each $p$ and $q$ has a value of 2.

5. Lauryl trioxyethylene bis-(2-hydroxyethyl) amine oxide.

6. p-Nonylphenyl tetraoxyethylene bis - (2-hydroxyethyl) amine oxide.

7. p-Octylphenyl dioxyethylene bis-(2-hydroxypropyl amine oxide.

8. Lauryl dioxyethylene bis-(2-hydroxypropyl) amine oxide.

9. Lauryl-trioxyethylene bis-(2-hydroxypropyl) amine oxide.

10. Lauryl-trioxypropylene bis-(2-hydroxyethyl) amine oxide.

11. Lauryl-dioxyethylene bis-(2″-hydroxypropyl dioxypropylene) amine oxide.

12. Lauryl-trioxyethylene bis - (2″-hydroxyethyldioxyethylene) amine oxide.

13. Cetyl-dioxyethylene bis-(2-hydroxyethyl)amine oxide.

14. Oleyl-trioxyethylene bis - (2-hydroxyethyl) amine oxide.

15. Lauryl-trioxyethylene monoethyl 2-hydroxypropyl amine oxide.

References Cited

UNITED STATES PATENTS

| 2,115,250 | 4/1938 | Bruson | 260—570.7 XR |
| 2,169,976 | 8/1939 | Guenther et al. | 260—570.7 |
| 2,170,111 | 8/1939 | Bruson | 260—570.7 XR |
| 2,229,024 | 1/1941 | Bruson | 260—570.7 XR |
| 3,117,999 | 1/1964 | Boettner et al. | 260—584 |
| 3,206,512 | 9/1965 | Koebner et al. | 260—570.7 |
| 3,221,054 | 11/1965 | Arnold et al. | 260—570.7 |
| 3,255,253 | 6/1966 | Kuryla | 260—570.7 XR |

CHARLES B. PARKER, *Primary Examiner.*

R. V. HINES, *Assistant Examiner.*

UNITED STATES PATENT OFFICE

CERTIFICATE OF CORRECTION

Patent No. 3,356,727                          December 5, 1967

Adolf Koebner et al.

It is hereby certified that error appears in the above numbered patent requiring correction and that the said Letters Patent should read as corrected below.

Column 5, line 65, for "instatnce" read -- instance --; column 10, line 22, for $$-C_qH_{3q}O- \quad\quad\quad read \quad\quad\quad -C_qH_{2q}O-$$

line 38, for "bis-(2-hydroxypropyl" read -- bis-(2-hydroxypropyl) --.

Signed and sealed this 7th day of January 1969.

(SEAL)
Attest:

Edward M. Fletcher, Jr.                          EDWARD J. BRENNER
Attesting Officer                                Commissioner of Patents